(12) United States Patent
Cross et al.

(10) Patent No.: US 9,026,269 B2
(45) Date of Patent: May 5, 2015

(54) SYSTEM AND METHOD FOR PROVIDING WIRELESS POWER AND CONTROL SIGNALS TO A TROLLEY

(71) Applicant: Tait Towers Manufacturing, LLC, Lititz, PA (US)

(72) Inventors: Nathan Hoover Cross, Lancaster, PA (US); James D. Love, Lititz, PA (US)

(73) Assignee: Tait Towers Manufacturing, LLC, Little, PA (US)

( * ) Notice: Subject to any disclaimer, the term of this patent is extended or adjusted under 35 U.S.C. 154(b) by 56 days.

(21) Appl. No.: 13/744,665

(22) Filed: Jan. 18, 2013

(65) Prior Publication Data

US 2014/0207310 A1    Jul. 24, 2014

(51) Int. Cl.
| | |
|---|---|
| *G05D 1/00* | (2006.01) |
| *B60L 15/40* | (2006.01) |
| *B60L 11/00* | (2006.01) |
| *B60L 11/18* | (2006.01) |

(52) U.S. Cl.
CPC ............. *B60L 15/40* (2013.01); *B60L 11/005* (2013.01); *B60L 11/182* (2013.01); *B60L 11/1831* (2013.01); *B60L 2200/44* (2013.01); *B60L 2240/12* (2013.01); *B60L 2240/14* (2013.01); *B60L 2240/62* (2013.01)

(58) Field of Classification Search
USPC ............................................................. 701/2
See application file for complete search history.

(56) References Cited

U.S. PATENT DOCUMENTS

| | | | |
|---|---|---|---|
| 5,293,308 A | 3/1994 | Boys et al. | |
| 5,864,474 A * | 1/1999 | Jang ................................ | 363/39 |
| 6,009,003 A * | 12/1999 | Yeo ................................ | 363/37 |
| 8,093,758 B2 | 1/2012 | Hussmann et al. | |
| 8,183,938 B2 | 5/2012 | Boys et al. | |
| 8,628,289 B1 * | 1/2014 | Benedict et al. ............... | 414/234 |
| 2002/0141212 A1 * | 10/2002 | Ishida et al. ..................... | 363/98 |
| 2010/0034626 A1 * | 2/2010 | Reiniger et al. ............... | 414/253 |
| 2010/0163683 A1 * | 7/2010 | Quine ......................... | 244/158.5 |
| 2010/0260586 A1 * | 10/2010 | Manone et al. ............... | 414/401 |
| 2012/0117730 A1 * | 5/2012 | Lemire et al. ..................... | 5/611 |
| 2012/0217818 A1 * | 8/2012 | Yerazunis et al. ............. | 307/104 |
| 2013/0024059 A1 * | 1/2013 | Miller et al. ..................... | 701/22 |
| 2013/0333587 A1 * | 12/2013 | Benish et al. .................. | 104/118 |
| 2014/0023469 A1 * | 1/2014 | Lambarth et al. ............. | 414/513 |

* cited by examiner

*Primary Examiner* — Hussein A. Elchanti

(57) ABSTRACT

A trolley system for the entertainment industry can receive power and control signals wirelessly. The trolley system can be wirelessly powered by an inductive power transfer system that is associated with the support member the trolley travels along. The trolley system can use a leaky feeder system for the wireless exchange of data, information and control instructions with an automation and motion and control system. The trolley can include additional components, e.g., a winch, that also receive power and control signals wirelessly.

21 Claims, 4 Drawing Sheets

SYSTEM AND METHOD FOR PROVIDING WIRELESS POWER AND CONTROL SIGNALS TO A TROLLEY

BACKGROUND

The application relates generally to trolley systems used in the entertainment industry. The application relates more specifically to a system and method for providing wireless power and control signals to a trolley.

A trolley can be used in the entertainment industry to enhance a live performance or event, e.g., a sporting event, a concert or a theatrical/religious performance, or a movie or television production, by moving or transporting performers, scenery and/or props. In addition, the trolley can be configured as a combination of multiple types of devices, which can include lifts, chain hoists, winches, elevators, carousels, turntables, multi-axis systems, linear motion systems (e.g., deck tracks and line sets), audio devices, lighting devices, and/or video devices. For example, a trolley can be combined with one or more winches that can be operated while the trolley is in motion.

To properly operate the trolley and any other associated devices mounted on the trolley for use in a live performance or movie or television production, both power and control signals must be provided to the trolley and each associated device. In many arrangements, the power to the devices can be provided from a power grid(s) at the location of the performance or production and the control signals for the devices can be provided from an automation and motion control system. The automation and motion control system can provide the control signals to control the movement of the trolley and the operation of the devices on the trolley.

To provide the power and control to the trolley and any associated devices, power and control wires can be provided to the trolley and then distributed as needed to the associated devices mounted on the trolley. In this type of arrangement, the corresponding power and control wires have to be long enough to enable the trolley to travel all of its predetermined path. The long power and control wires needed for the trolley can cause numerous problems during the live performance or television or movie production. For example, the long power and control wires have to be stored when the trolley is in a starting position. In addition, the power and control wires have to be extended and retracted without tangling as the trolley moves along its predetermined path. The extension and retraction of wires can be even more difficult to manage if the predetermined path has curves or crosses over itself. If the trolley is elevated or above the ground, these wire handling problems are made even worse because the power and control wires need to remain out of sight from a person viewing the live performance or television or movie production.

Therefore, what is needed is a system and method that can provide power and control signals to a trolley and any devices mounted on the trolley without the use of wires.

SUMMARY

The present invention is directed to a trolley system. The trolley system includes a support member and a trolley mounted on the support member. The trolley is operable to travel along the support member. The trolley system also includes a power system and a control system to control operation of the trolley. The power system is operable to wirelessly power the trolley. The control system is operable to wirelessly communicate with the trolley.

The present invention is also directed to a method of wirelessly providing power and control to a trolley used in the entertainment industry. The method includes providing a trolley mounted on a support member. The trolley is operable to travel a predetermined path defined by the support member. The method also includes mounting a primary circuit of an inductive power transfer system on the support member and mounting a plurality of communication points near the support member. The plurality of communication points enable communication between the trolley and a control system. The method further includes providing power to the primary circuit from a power grid and inducing a current in a pickup circuit on the trolley in response to the pickup circuit being near the primary circuit. The induced current from the pickup circuit is used to power the trolley.

In an exemplary embodiment, the trolley can be powered by inductive power transfer system. The system can include a pick-up circuit (or receiver) located on the trolley to receive power transmitted by a pick-up coil (or transmitter) when the pick-up circuit is in alignment with the pick-up coil. The system can include one or more pick-up coils located at different positions along the path of the trolley including the starting position, ending position and/or intermediate points along the path.

One advantage of the present application is that it can be used in a variety of different environments including indoor environments, outdoor environments and underwater environments since power and control signals are transmitted wirelessly.

Other features and advantages of the present application will be apparent from the following more detailed description of the disclosed embodiments, taken in conjunction with the accompanying drawings which illustrate, by way of example, the principles of the application.

BRIEF DESCRIPTION OF THE DRAWINGS

Wherever possible, the same reference numbers will be used throughout the drawings to represent the same parts.

DETAILED DESCRIPTION OF THE EXEMPLARY EMBODIMENTS

Figure 1:
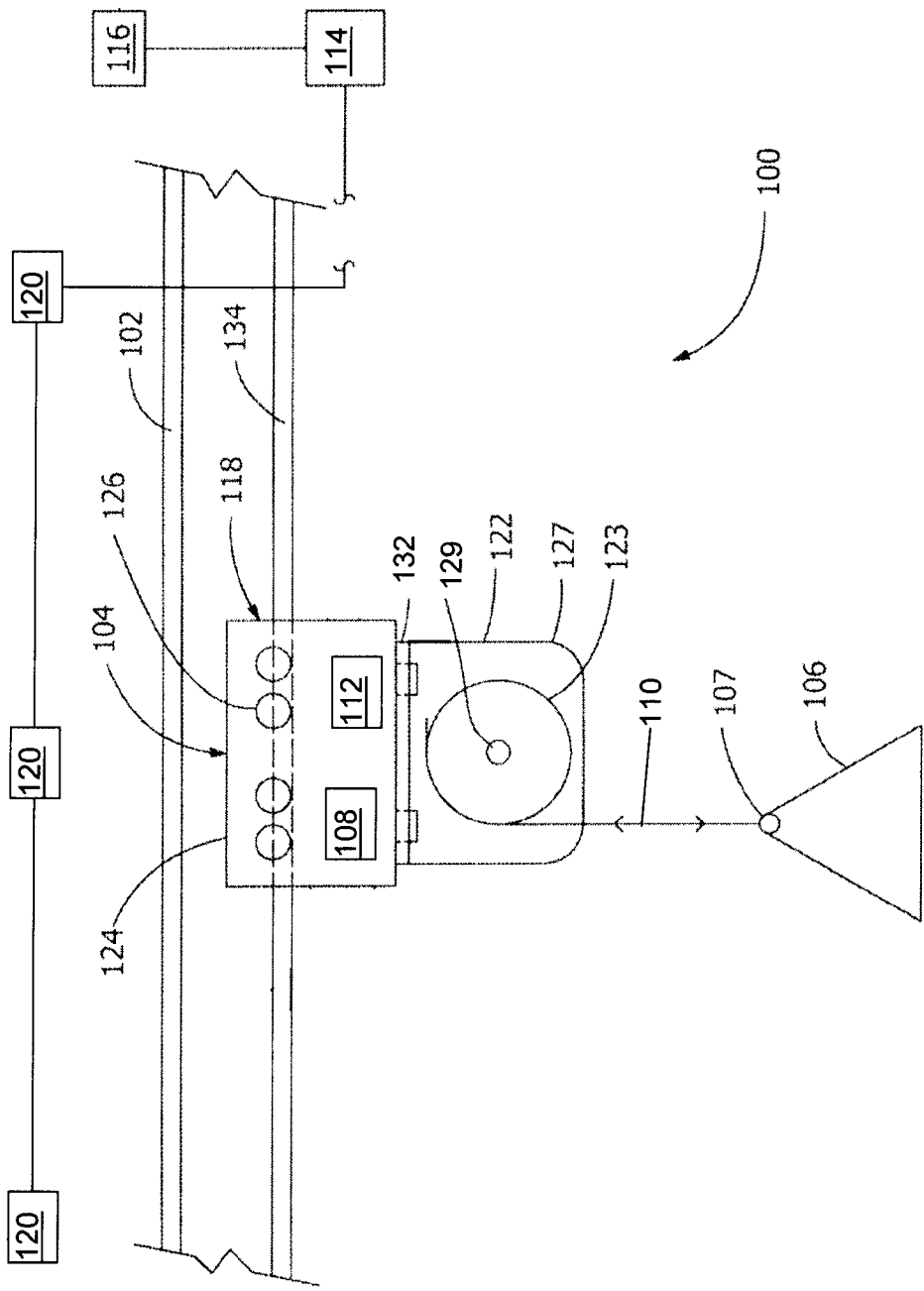
FIG. 1 schematically shows an exemplary embodiment of a trolley system.

FIG. 1 shows an exemplary embodiment of a trolley system 100. The system 100 can include at least one support member 102, at least one trolley or carriage 104, at least one load 106, at least one travel positioning mechanism 112, at least one lift positioning mechanism 123, at least one lift line 110 and at least one automation and motion control system 116 to control the operation of the system 100, including the travel positioning mechanism 112 and the lift positioning mechanism 123. The system 100 can position and reposition a load 106 in a two-dimensional (2D) or three-dimensional (3D) space according to a control algorithm executed by the control system 116 by moving the trolley 104 along the support member 102 and by moving the lift line 110 by the lift positioning mechanism 123.

The support member 102 can be a beam or other suitable member such as a track, rail, truss or pipe that can provide structural support for the trolley or carriage 104 (or a suspended shuttle or cart or tram or any other apparatus that can move along the support member 102 and support the load 106). In an exemplary embodiment, the support member 102 can be mounted above the performance area of a live performance or event, e.g., a sporting event, a concert or a theatrical/religious performance, or a movie or television production. In another exemplary embodiment, the support member 102 can be mounted on or in the floor of the performance area. The system 100 can include multiple support members 102 mounted at various angles (e.g., between about 0 degrees and about 45 degrees) relative to the performance area or mounted at various angles (e.g., between about 0 degrees and about 45 degrees) relative to each other. The multiple support members 102 can have any suitable arrangement or configuration including stacked, parallel, or intersecting.

In an exemplary embodiment, the support member 102 can be a substantially straight, elongate member. In another exemplary embodiment, the support member 102 can be curved, or have curved portions. In a further embodiment, the support member 102 can be segmented, including connector members (not shown) joining the various segments. Alternatively, the support member 102 can be of unitary construction.

The load 106 can be any suitable object that can be positioned and repositioned relative to the performance area. Suitable loads include, but are not limited to, performers, equipment, instruments, props, lights, lighting systems, cameras, scenery, sets, microphones, or speakers.

In one embodiment, the trolley or carriage 104 can have one or more travel positioning mechanisms or drive mechanisms 112 mounted on or incorporated in the trolley or carriage 104 to move the trolley or carriage 104. The travel positioning mechanism or drive mechanism 112 can be powered either directly from a wireless power source, e.g., an inductive power transfer system, or from batteries or other energy storing devices charged by the wireless power source. When actuated or engaged, the travel positioning mechanism(s) 112 can adjust the position, speed, and acceleration or deceleration of the trolley or carriage 104 along the support member 102.

The lift line 110 can be an elongate member such as cable, rope, cord, band, chain-links or hydraulic or pneumatic cylinder. In one embodiment, the system 100 further includes one or more additional support guides (not shown) for supporting the lift line 110 securely in its travel path as the trolley or carriage 104 moves along the support member 102. The lift line 110 can be used to provide motion and positioning to the load 106. The lift line 110 is connected to the load 106 and to the lift positioning mechanism 123 mounted to the trolley or carriage 104. The lift positioning mechanism 123 controls the lift line 110 to adjust the position, speed, and acceleration or deceleration of the load 106 relative to the carriage 104.

The lift positioning mechanism 123 controls the lift line 110 substantially simultaneously with the travel positioning mechanism 112 controlling the movement of trolley or carriage 104, to permit load 106 to be positioned and repositioned as carriage 104 is positioned and repositioned along support member 102. In one embodiment, the lift positioning mechanism 123 can be an automated device, such as a variable control or computer controlled winch, chain hoist, lift or elevator.

In one embodiment, the trolley or carriage 104 can include a cart 118 and a load mount 122. The cart 118 can include a plurality of wheels or rollers 126, at least one of which is driven by the travel positioning mechanism 112. A cart frame 124 can include a load mounting member connection 132 positioned proximal to the load 106. The plurality of wheels or rollers 126 can engage, roll, and/or slide along an engagement surface 134 of the support member 102, enabling the cart 118 and carriage 104 to move along the support member 102.

The load mount 122 includes at least one lift positioning mechanism 123, a frame 127, and a pivot shaft 129. The frame 127 attaches to the load mounting member connection 132 of the cart frame 124. The lift positioning mechanism 123 is mounted to the frame 127 and is connected to the pivot shaft 129. The lift positioning mechanism 123 is configured to engage the lift line 110 to position the load 106. An end 107 of the lift line 110 is connected to the load 106, and a second end is connected to the lift positioning mechanism 123.

The automation and motion control system 116 can wirelessly provide control instructions to the travel positioning mechanism 112 and the lift positioning mechanism 123 using a control transmitter 114 connected to the control system 116 and a plurality of broadcast or transmission points 120 connected to the control transmitter 114. The broadcast or transmission points 120 can provide the control instructions from the control system 116 to a receiver 108 on the trolley 104. While the control transmitter 114 is shown separate from the control system 116 in the embodiment of FIG. 1, the control transmitter 114 could be an integral component of the control system 116 in another embodiment. In an exemplary embodiment, the control transmitter 114, the broadcast or transmission points 120 and the receiver 108 can each be a transceiver or other similar device capable of both sending and receiving control instructions, data and/or other information or signals.

In an exemplary embodiment, the broadcast or transmission points 120 can be part of a radiating or leaky feeder or leaky coax system. A leaky feeder or leaky coax system used with the system 100 can include one or more coaxial cables with integrated broadcast or transmission points 120 that extend along the support member 102 for substantially the entire predetermined path to be traveled by the trolley 104. However, in other embodiments, the broadcast or transmission points 120 can use any suitable communication device to wirelessly send and receive control instructions between the control system 116 and a receiver 108 on the trolley 104.

Figure 2:
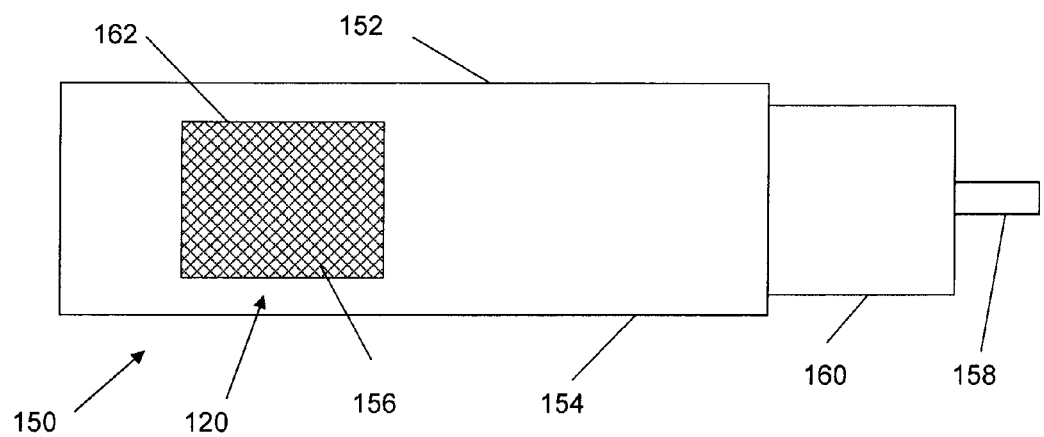
FIG. 2 schematically shows an exemplary embodiment of a leaky feeder cable.

FIG. 2 shows an exemplary embodiment of a leaky feeder cable. The leaky feeder cable 150 includes a coaxial cable 152 having an outer sheath or cover 154. The coaxial cable also includes an outer conductor 156 separated from an inner conductor 158 by insulating material 160. The coaxial cable 152 can have breaks or openings 162 in its outer insulation and covering 154 to permit the corresponding exposed portions of the outer conductor 156 of the coaxial cable 152 to send and receive control instructions, data and/or other information or signals. In an exemplary embodiment, the breaks or openings 162 in the coaxial cable 152 can be placed at repeating preselected intervals, e.g., the breaks or openings 162 can be placed 2 feet apart. In another embodiment, the breaks or openings 162 can be placed at a variety of different intervals that are selected for the particular predetermined path of the trolley 104. Each break or opening 162 in the coaxial cable 152 can correspond to a broadcast or transmission point 120. Depending on the length of the predetermined path of the trolley 104 and coaxial cable 152, one or more amplifiers and/or repeaters can be used to maintain a preselected signal strength in the coaxial cable 152.

In one exemplary embodiment, the wireless power system used to provide power to the travel positioning mechanism 112 can be an inductive power transfer or distribution system that uses electromagnetic induction to transfer power. The inductive power transfer system can include a primary part or circuit (power transmitter) that induces an electric current in a secondary part or circuit or pick-up coil or circuit (power receiver). The primary circuit can be connected to a power supply or power grid and can be fixed in location. The secondary circuit can be incorporated in the trolley 104 and can move relative to the primary circuit. The secondary circuit is connected to the travel positioning mechanism 112 and any other electrical components mounted on the trolley 104 to provide power to each of the components.

Figure 3:
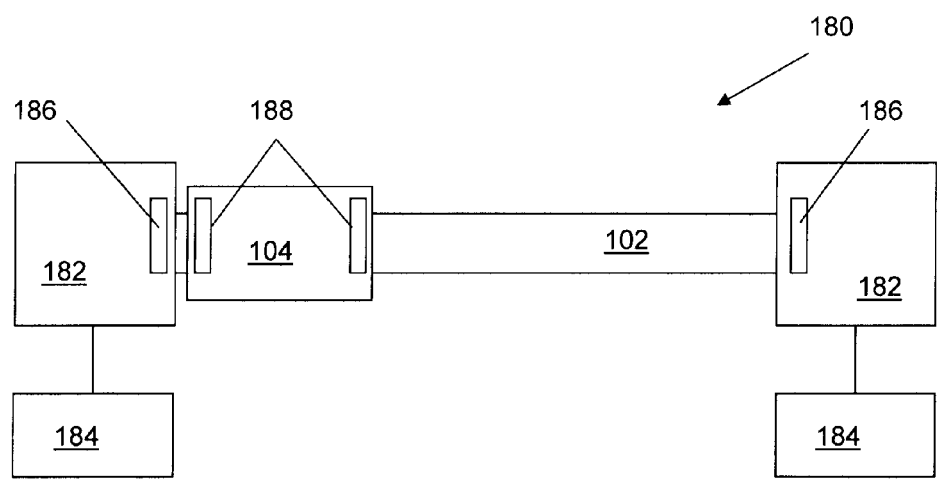
FIGS. 3 and 4 schematically show exemplary embodiments of inductive power transfer systems.
Figure 4:
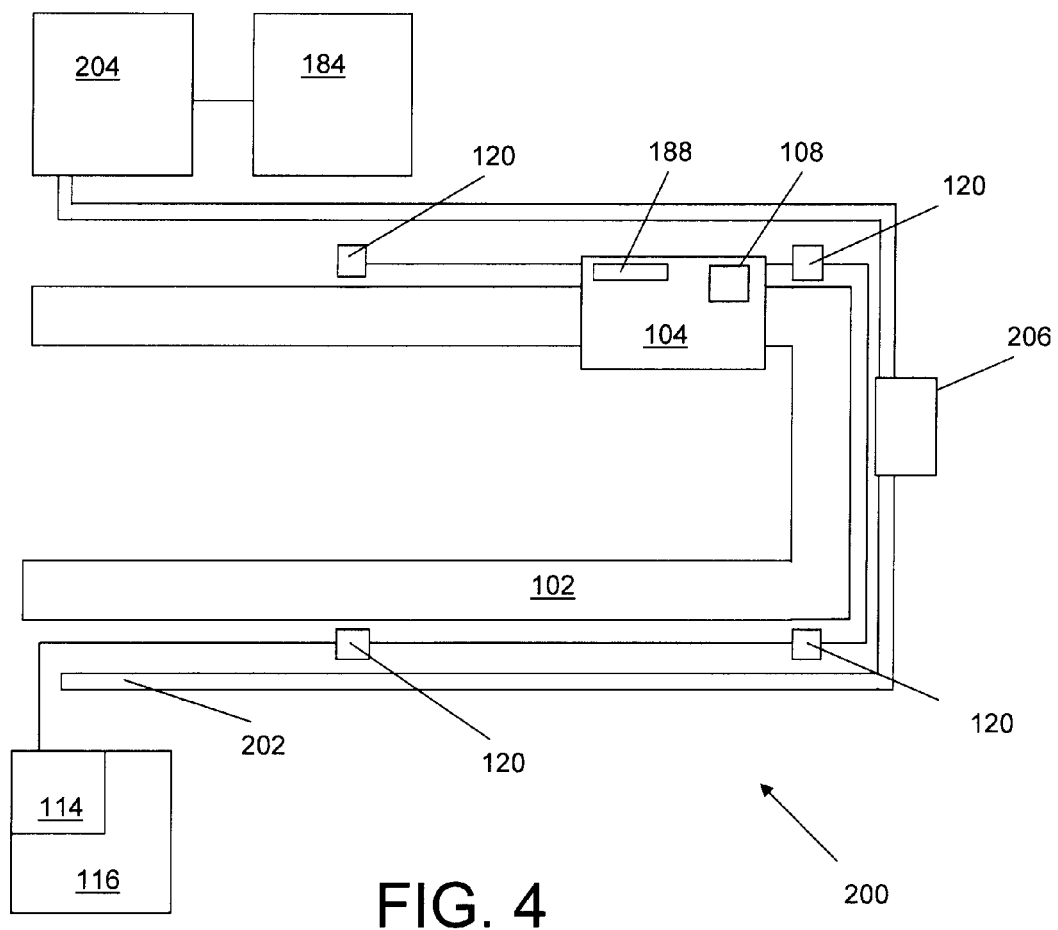

FIGS. 3 and 4 show exemplary embodiments of power systems that can provide power to the trolley 104. FIG. 3 shows an exemplary embodiment of an inductive power transfer system with "charging stations" located at the beginning and end of the predetermined path for the trolley. FIG. 4 shows an exemplary embodiment of an inductive power transfer system that can provide power along the entire predetermined path for the trolley.

As shown in FIG. 3, the inductive power transfer system 180 can include power transfer or charging stations 182 located at the starting position and the ending position for the trolley 104 along the predetermined path established by the support member 102. Each power transfer station 182 can receive power from a power supply or power grid 184. The power supply 184 can provide voltages between 100 V and 600 V to the power transfer station 182. The power transfer station 182 can then condition and convert the power from the power supply 184, as needed, to provide power to primary circuit 186. When powered, the primary circuit 186 emits an electromagnetic field that can induce a current in pickup or secondary circuit 188 when the pickup circuit 188 is near or in proximity to the primary circuit 186. The current from pickup circuit 188 can then be used to charge batteries or other power saving devices located on the trolley 104. The batteries on the trolley 104 can then be used to provide power to the travel positioning mechanism 112 to move the trolley along the support member 102. The trolley 104 can be charged at one power transfer station 182 to make the trip along the support member 102 to the opposite end. Once the trolley 104 has reached its destination, the trolley 104 can be charged by the other power transfer station 182 to make the return trip along the support member 102. In the embodiment shown in FIG. 3, the trolley 104 can include multiple pickup circuits 188 that enable the trolley 104 to receive power from primary circuits 186 located at different positions relative to the trolley 104. In another embodiment, power transfer stations 182 can be located at intermediate points along the support member 102 to charge the batteries of the trolley 104 in response to the trolley 104 being stopped at the intermediate point in accordance with a pre-established motion plan for the trolley 104.

As shown in FIG. 4, the inductive power transfer system 200 can include a primary circuit or track 202 that extends along the entire length of the support member 102 to enable the trolley 104 to be continuously powered independent of its position on the support member 102. The primary circuit or track 202 can be powered from a track supply 204 and can include one or more capacitors or other storage devices 206 to maintain the electromagnetic field along the entire length of the support member 102. The track supply 204 can receive power from a power supply or power grid 184. The power supply 184 can provide voltages between 100 V and 600 V to the track supply 204. The track supply 204 can then condition and convert the power from the power supply 184, as needed, to provide power to primary circuit or track 202. When powered, the primary circuit or track 202 continuously emits an electromagnetic field along the support member 102 that can induce a current in pickup or secondary circuit 188 on the trolley 104 when the pickup circuit 188 is near or in proximity to the primary circuit 186. The current from pickup circuit 188 can then be used to directly power the travel positioning mechanism 112 and any other components on the trolley. In an alternate embodiment, the current from the pickup circuit 188 can charge batteries or other power saving devices located on the trolley 104. Since the primary circuit or track 202 extends along the entire length of the support member 102, the primary circuit or track 202 can induce current in the pickup circuit 188 at any location along the support member 102. In addition, the receiver 108 on trolley 104 can receive control signals from the control system 116 that are transmitted by broadcast points 120 to control operation of the trolley 104 and any components mounted on the trolley 104. While the embodiment shown in FIG. 4 has the primary circuit or track 202 and the broadcast points 120 as being separate from the support member 102, one or both of the primary circuit or track 202 and the broadcast points 120 can be incorporated in or on the support member 102.

Figure 5:
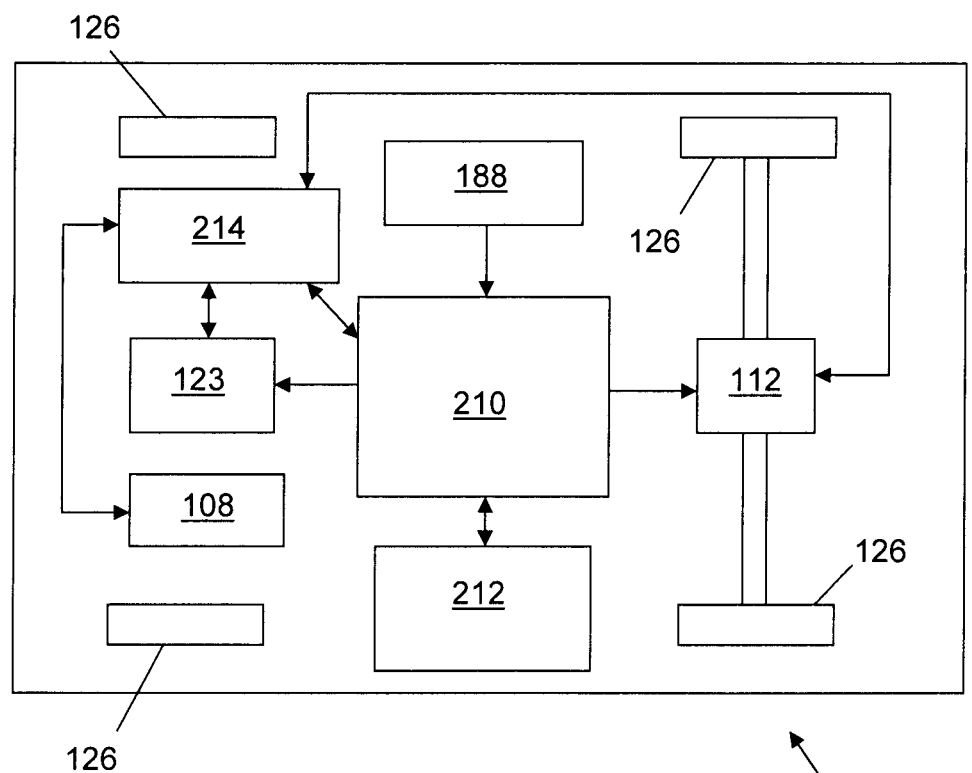
FIG. 5 schematically shows an exemplary embodiment of a trolley.

FIG. 5 schematically shows an embodiment of a trolley 104. The trolley 104 can include a travel positioning mechanism 112 to drive wheels 126 and a load positioning mechanism 123 to adjust the position of a load connected to the trolley 104. The travel positioning mechanism 112 and the load positioning mechanism 123 can be powered from a power conversion device 210. The power conversion device 210 receives the induced power from pickup circuit 188 and then provides the power directly to the travel positioning mechanism 112 and the load positioning mechanism 123 or stores the power in batteries or other power storing devices 212. The power conversion device 210 can take the power from the batteries 212 to power the travel positioning mechanism 112 and the load positioning mechanism 123. The power conversion device 210 can include filters, transformers, etc., to enable the power conversion device 210 to provide the appropriate power to the components of the trolley 104.

As previously discussed, the trolley 104 also includes the receiver 108 to exchange control instructions and data with the broadcast points 120. The receiver 108 is in communication with a controller 214 that can provide the appropriate control instructions to the components, e.g., power conversion device 210, travel positioning mechanism 112 and load positioning mechanism 123, on the trolley 104 to provide the desired operation of the trolley 104 and its associated components. The controller 214 can include a microprocessor, memory devices, interfaces and any other components needed to execute control algorithms and control operation of the trolley 104. The controller 214 can receive control instructions from the control system 116 and can then execute corresponding control functions based on the control instructions to control the operation of the trolley 104.

In one exemplary embodiment, the trolley 104 can include carousels, turntables, multi-axis systems, linear motion systems (e.g., deck tracks and line sets), audio devices, lighting devices, and/or video devices either in combination with lift positioning mechanism 123 or in place of lift positioning mechanism 123. The power and control for any additional components can be provided in a manner similar to the providing of power and control to the lift positioning mechanism 123.

In another exemplary embodiment, the wireless power system can include the use of a "live" rail or bus bar incorporated in the support member(s) 102 to directly provide power to the trolley 104. The bus bar can be an energized component or rail, i.e., current is flowing through the component or rail, placed in or on support member 102 that can provide power directly to a corresponding contact device on the trolley 104. The power is transferred between the bus bar and trolley 104 when the contact device touches or is in contact with the energized component or rail. The trolley 104 may include one or more batteries to provide power to the trolley 104 if contact is lost between the contact device and the energized component. The energized component can be located on the entire length of the support member 102 or the energized component can include multiple components placed at different locations on the support member 102.

In still another embodiment, multiple trolleys can be mounted on the same support member 102. Each trolley can be powered from the same wireless power supply and can wirelessly receive control signals from the control system.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A trolley system comprising:
    a control system
    a support member;
    a trolley mounted on the support member and configured to travel a predetermined path defined by the support member;
    a primary circuit of an inductive power transfer system mounted on the support member;
    a plurality of communication points mounted near the support member, the plurality of communication points enabling communication between the trolley and the control system;
    wherein the control system is configured to:
    provide power to the primary circuit from a power grid; and
    induce a current in a pickup circuit on the trolley in response to the pickup circuit being near the primary circuit, the induced current from the pickup circuit being used to power the trolley.

2. The trolley system of claim 1 wherein the power system comprises an inductive power transfer system.

3. The trolley system of claim 2 wherein the inductive power transfer system comprises:
    a primary circuit having a fixed location, the primary circuit being operable to emit an electromagnetic field; and
    a pickup circuit mounted on the trolley, the pickup circuit being operable to receive an induced current in response to the pickup circuit being near the primary circuit.

4. The trolley system of claim 3 wherein the fixed location of the primary circuit is at an end of the support member.

5. The trolley system of claim 3, wherein the fixed location of the primary circuit is along the entire support member.

6. The trolley system of claim 5 wherein the primary circuit is incorporated in the support member.

7. The trolley system of claim 3 wherein the trolley comprises a drive mechanism to move the trolley along the support member.

8. The trolley system of claim 7 wherein the drive mechanism is powered directly from the pickup circuit.

9. The trolley system of claim 7 wherein the trolley comprises a power conversion device to receive power from the pickup circuit, the power conversion device providing power to the drive mechanism.

10. The trolley system of claim 9 wherein the trolley comprises a battery to store power from the power conversion device.

11. The trolley system of claim 10 wherein the drive mechanism is powered from the battery.

12. The trolley system of claim 1 wherein the control system comprises a plurality of communication points to wirelessly communicate with the trolley.

13. The trolley system of claim 12 wherein the control system comprises leaky feeder system to communicate with the trolley, the leaky feeder system includes the plurality of communication points.

14. The trolley system of claim 13 wherein the leaky feeder system comprises a coaxial cable, the coaxial cable having a plurality of openings exposing an outer conductor, each opening of the plurality of openings corresponding to a communication point.

15. The trolley system of claim 14 wherein the coaxial cable is mounted on the support member.

16. The trolley system of claim 1 wherein the trolley comprises at least one additional component, the least one additional component being powered by the power system and receiving control instructions from the control system.

17. The trolley system of claim 16 wherein the at least one additional component is a winch.

18. A method of wirelessly providing power and control to a trolley used in the entertainment industry, the method comprising:
    providing a trolley mounted on a support member, the trolley being operable to travel a predetermined path defined by the support member;
    mounting a primary circuit of an inductive power transfer system on the support member;

mounting a plurality of communication points near the support member, the plurality of communication points enabling communication between the trolley and a control system;

providing power to the primary circuit from a power grid; and inducing a current in a pickup circuit on the trolley in response to the pickup circuit being near the primary circuit, the induced current from the pickup circuit being used to power the trolley.

19. The method of claim 18 further comprises charging a battery in the trolley with the induced current from the pickup circuit.

20. The method of claim 18 wherein said mounting a plurality of communication points includes mounting a leaky feeder cable on the support member, the plurality of communication points corresponding to the opening in the leaky feeder cable.

21. The method of claim 18 further comprises mounting at least one component on the trolley, the at least one component being powered by the pickup circuit and being controlled by the control system.

* * * * *